INVENTOR.
BOUDEWIJN BOLLEE

INVENTOR.
BOUDEWIJN BOLLEE
BY

AGENT

United States Patent Office 3,436,630
Patented Apr. 1, 1969

3,436,630
ELECTROSTATIC SYNCHRONOUS MOTOR
Boudewijn Bollee, Emmasingel, Eindhoven, Netherlands, assignor to North American Philips Company, Inc., New York, N.Y., a corporation of Delaware
Filed Apr. 25, 1967, Ser. No. 633,440
Claims priority, application Netherlands, May 3, 1966, 6605934
Int. Cl. H02n 1/04
U.S. Cl. 318—116                      5 Claims

ABSTRACT OF THE DISCLOSURE

An electrostatic synchronous motor having tooth-shaped electrodes on the stator which cooperate with adjacent tooth-shaped electrodes on the rotor. The motor includes at least two stator elements electrically insulated from one another which cooperate with at least one rotor element which is electrically insulated from both the stator elements.

---

The invention relates to an electrostatic synchronous motor in which electrodes of a stator cooperate with electrodes of a rotor which are electrically insulated from the stator.

In such a motor, the current is supplied and conducted away through a connection terminal on the stator and through a slip contact on the rotor.

According to the invention, the electrostatic motor includes at least two stator elements electrically insulated from one another which are adjacent at least one rotor element. Hence, each electrode on the rotor cooperates at any instant of time with an adjacent electrode on each of the two stator parts. This cooperative relationship eliminates the necessity for a slip contact on the rotor. One phase of a supply voltage may be connected to each of the stator parts according to the invention. When three stator elements are used with a three phase voltage supply, the motor will be self-starting if the stator parts are connected so that a rotating field is produced.

Two stator elements are incorporated in a motor according to the invention and are connected to the same terminal of the supply voltage while the rotor is connected to the other supply voltage terminal. In this embodiment the rotor must be provided with a slip contact. The advantage provided by this arrangement is that the motor can operate at half the supply voltage while maintaining the power output. Such a motor can be commutated in a simple manner to two supply voltages differing from one another by a factor of 2.

According to a further embodiment of the invention, a diode is connected in series with the motor. The stator elements of the motor are connected to one terminal of the supply voltage and the rotor to the other terminal; thus, a motor is provided which is capable of running at half the original speed while the power output is increased by a factor of $4/\pi$.

A further embodiment of the invention includes biasing the rotor or stator element with a constant voltage. The bias voltage is preferably at least equal to the amplitude of the alternating supply voltage. A bias voltage of this magnitude will halve the speed of the motor but with the power output being directly proportioned to the bias voltage, hence a higher power will be produced.

The invention will be described more fully with reference to preferred embodiments thereof illustrated in the accompanying drawing, in which.

Figure 1:
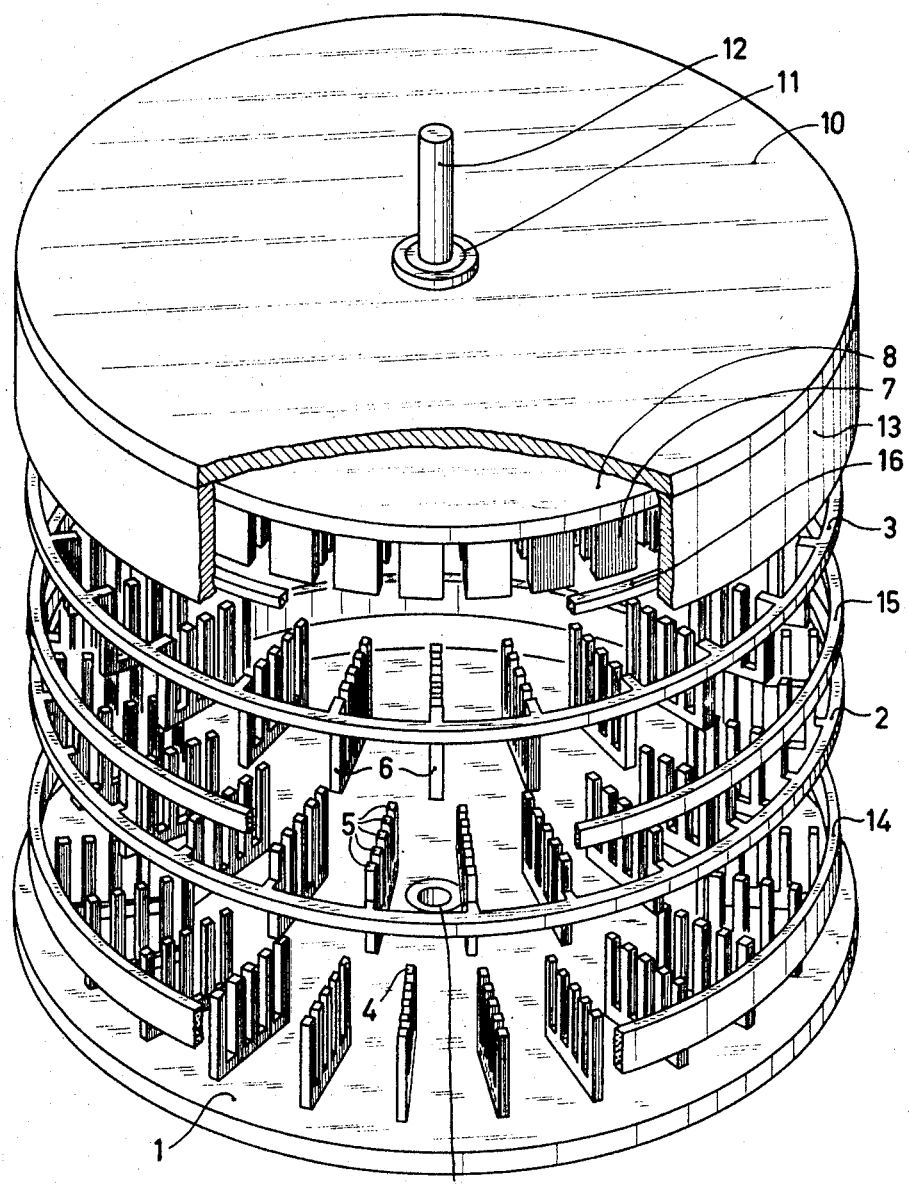
FIG. 1 shows a motor according to the invention having three stator elements.
Figures 4, 4A:
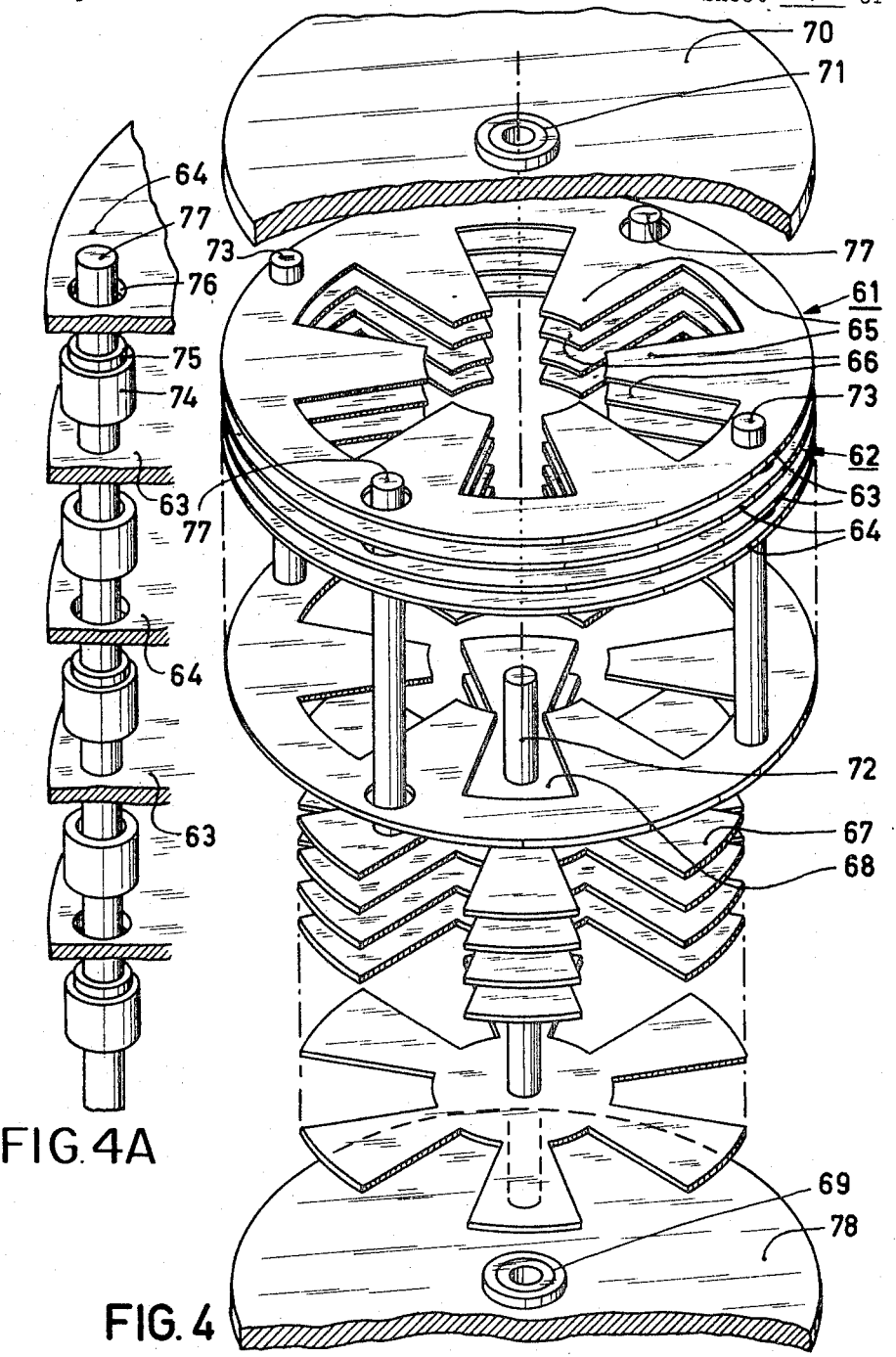
Figure 5:
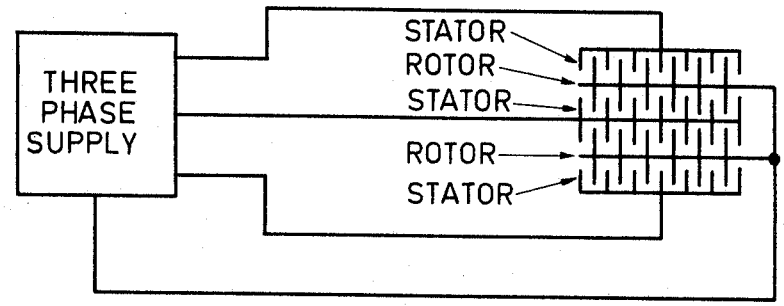
Figure 6:
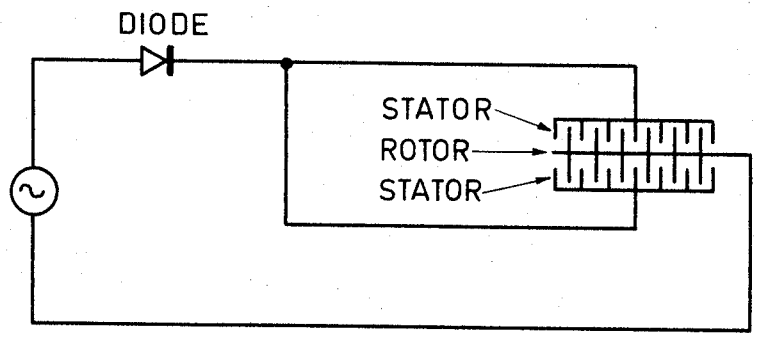
Figure 7:
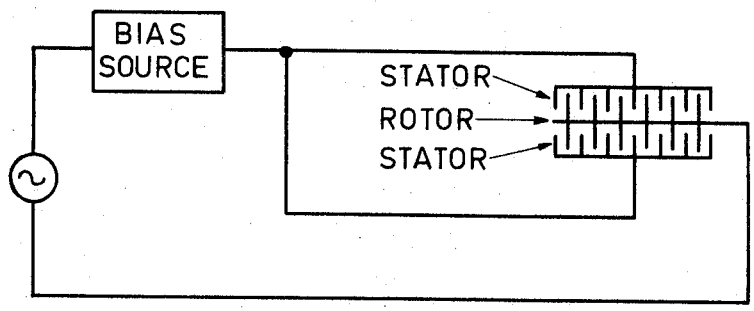

FIG. 4 illustrates a motor in which the teeth of the two stator elements are located alternately along the axis of the rotor shaft, FIG. 5 shows a schematic diagram of the motor of FIG. 1 connected to a three phase voltage supply, FIG. 6 shows a schematic diagram of a motor according to the invention connected in series with a diode, and FIG. 7 shows a schematic diagram of a motor according to the invention connected to a biasing source.

In FIG. 1, the electrostatic synchronous motor comprises three stator elements 1, 2 and 3 provided with a plurality of concentric (circular) rows of axially extending teeth 4, 5 and 6 between which can rotate four concentric (circular) rows of teeth 7 of a rotor 8. The rotor 8 is electrically insulated from the stator elements. Each row includes the same number of equally spaced teeth, therefore, when the teeth of each circular row are aligned with the teeth of an adjacent row, radially extending columns of teeth will be defined. In the circumferential direction, each tooth 7 of the rotor 8 has a width dimension at least equal to the corresponding dimension of a stator tooth and thus cooperates at any instant of time with an electrode of two stator elements. For example, tooth 7 can cooperate with the teeth 4 and 5, 5 and 6, or 6 and 4, depending on its instantaneous angular position. The cooperating tooth surfaces extend both in the axial direction and in the lateral or circumferential direction. Each of the stator elements 1, 2 and 3 may be connected to a single phase of a three phase voltage supply system as illustrated in the schematic diagram of FIG. 5. This results in an electrostatic rotating field such that, for example, a tooth 7 is first attracted by the teeth 4 and 5, then by the teeth 5 and 6 and then by the teeth 6 and 4, whereupon this process is continually repeated and the rotor is driven in one direction. The torque of the motor is increased if the number of concentric rows of teeth is increased. A low speed operation of the motor is achieved in a simple manner by arranging the teeth of the stator elements very close to each other so that each circular row will have a large number of teeth. The disc portion of stator element 1 also operates as an end shield for the motor. At the center of the disc a bearing 9 of electrical insulation material is located. At the opposite end of the motor a second end shield 10 is provided which also includes a bearing 11 of electrical insulation material. The rotor shaft 12 rotates in the bearings 9 and 11. Between the shields 1 and 10, there is disposed a spacer of insulating material 13 which is concentric with the rows of stator teeth. The stator elements 1, 2 and 3 are centered by the spacer 13 and are held in place in the axial direction by the additional electrical insulating spacers 14, 15 and 16. The inversion of any two phases of the three phase voltage system results in an inversion of the polarity of the rotating field thereby causing the motor to run in the opposite direction.

Figure 2:
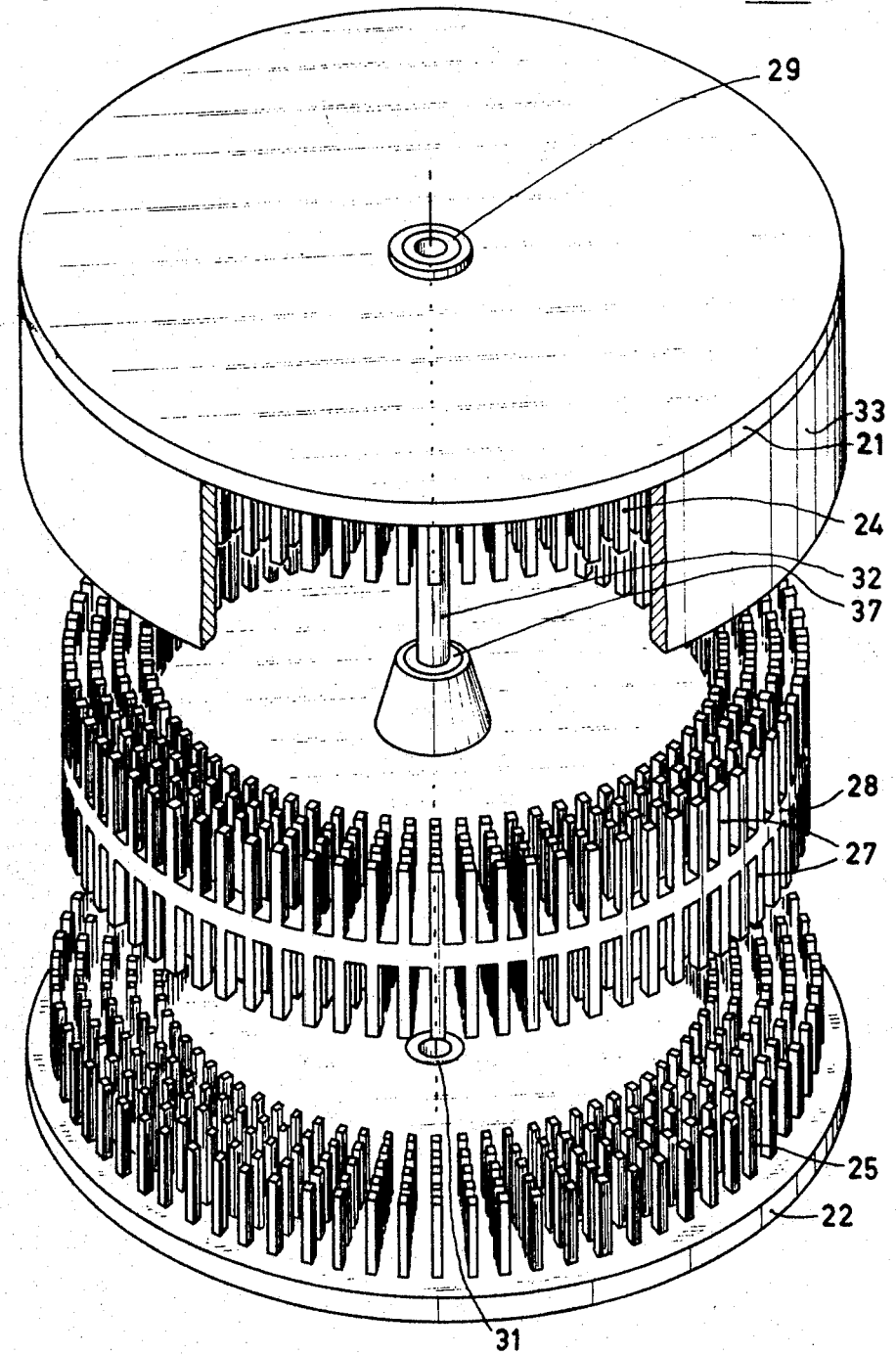
FIG. 2 shows a motor according to the invention having two stator elements.

FIG. 2 shows a motor having a disc-shaped rotor 28 which includes four concentric rows of teeth 27 mounted on each of the disc faces. Each tooth on the upper rotor face is axially aligned with a corresponding tooth on the lower rotor face. The teeth 27 on the upper rotor face cooperate with the teeth 24 of the stator element 21 while the teeth 27 on the lower rotor face cooperates with the teeth 25 on the lower stator element 22. The rows of rotor teeth 27 extend into the annular space between the rows of stator teeth 24 and 25. The dimension of the rotor teeth in the circumferential direction is approximately equal to the corresponding dimension of the stator teeth. The cooperating surfaces of the rotor and stator element teeth extend both in the axial direction and in the circumferential direction. The disc portion of stator elements 21 and 22 constitute the end shields for the motor and are provided with bearings 29 and 31 respectively. The rotor shaft 32 is electrically insulated from the rotor 28 by means of a sleeve 37 of electrical insulation material. The stator elements 21 and 22 are centered and axially positioned with respect to each other by a spacer 33 of electrical insulation material. In order to provide an increase in torque, the number of rows of rotor and stator teeth should be increased. The supply voltage can be connected to the two stator elements 21 and 22 in order to obtain a motor which is suitable for operating at a relatively high voltage. A slip contact on the rotor for establishing a connection with the supply voltage is unnecessary. If such a slip contact is nevertheless provided, the stator elements can be connected to one terminal of the supply voltage and the rotor to the other terminal; as a result of which the motor supplies the same power at half the supply voltage. This latter arrangement is suitable for applications in which it is desirable for the motor to be commutated with more than one A.C. voltage. The two electrostatic motor embodiments illustrated in FIGS. 1 and 2 provide a motor which has a relatively flat configuration.

Figure 3:
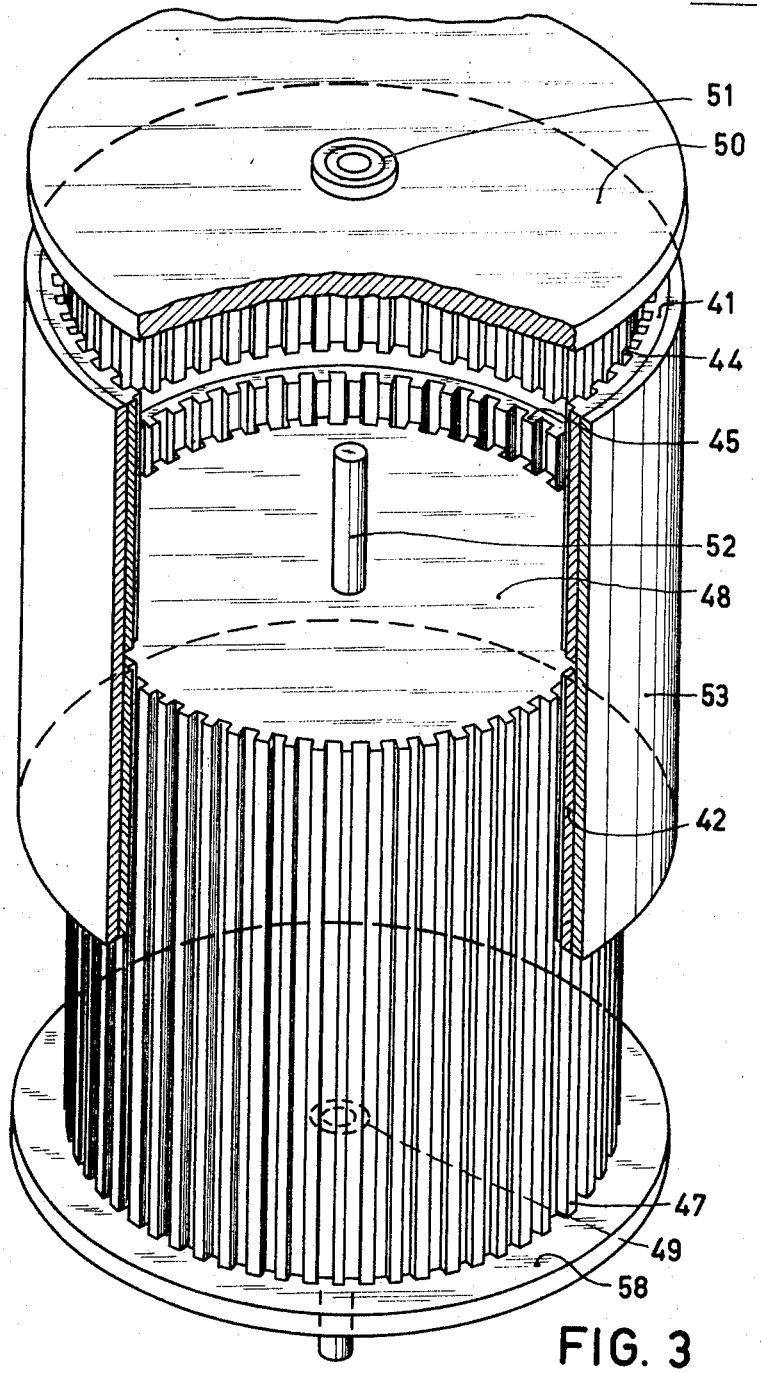
FIG. 3 shows an alternative embodiment of a motor having two stator elements.

In the motor of FIG. 3, the stator parts 41 and 42 are cylindrical sections provided with axially extending teeth 44 and 45 positioned on the inner diametral surface. These teeth 44 and 45 cooperate with the teeth 47 of a cylindrical rotor 48 which is adapted to rotate about a shaft 52 in bearings 49 and 51 in the end shields 50 and 58. The rotor is electrically insulated from the stator parts. The stator parts 41 and 42 are also electrically insulated from one another and are arranged in a cylindrical spacer 53 of electrical insulation material on which end shields 50 and 58 are disposed. In this motor, the width of the rotor teeth is preferably substantially equal to that of the stator teeth. Torque output of the motor is increased by increasing the length of the rotor and stator teeth thereby increasing the cooperating surface areas of the respective teeth.

In FIG. 4, the motor consists of two stator element assemblies 61 and 62 which include a plurality of axially stacked and alternately positioned plates 63 and 64 respectively. Plates 63 and 64 have included thereon teeth 64 and 66 which extend radially inwardly with respect to the axis of rotor shaft 72. Individual rotor plates 68 are located between each of the stator plates 63 and 64. The radially outwardly extending teeth 67 of any rotor plates 68 cooperate with the teeth 65 and 66 of any two adjacent stator plates 63 and 64. The cooperating surfaces of the teeth 65, 67 and 66 are substantially equal in area and are positioned at right angles to the rotary shaft. The stator plates 63 of the stator element assembly 61 are interconnected by two rods 77 and are insulated from the stator element assembly 62 by means of insulation sleeves 74. The sleeves 74 are provided with collars 75 which fit into the holes 76 in the plates 64. This hole has a larger diameter than the diameter of rods 77. The second stator element assembly 62 including the plates 64 are interconnected by means of rods 73. The plates 63 of the stator assembly 61 are also insulated from the stator assembly 62 by means of spacer sleeves 74 wherein the sleeves have collars fitting into enlarged holes in the plates 63. In this embodiment, the torque can be increased by increasing the number of plates included in each stator element assembly. The end plates 70 and 78 accommodate insulated bearings 71 and 69 in which the rotor shaft 72 is adapted to rotate.

A diode can be connected in series with the motors of FIGS. 1–4 in the manner shown in FIG. 6. The stator elements of the motor are then connected to one terminal of the supply voltage and the rotor to the other terminal; thus providing a motor which runs at one-half the normal speed while the power output is increased by a factor of $4/\pi$.

In all the previously described embodiments, the motors can be biased with a constant voltage as shown in FIG. 7. The bias voltage is preferably at least equal to the amplitude of the alternating supply voltage thereby halving the speed of the motor and increasing the power supplied in direct proportion to the bias voltage. The biasing is preferably achieved by means of electrets so that a separate direct voltage source can be dispensed with.

The above cited embodiments are intended as exemplary only, and while I have described my invention with a specific application and embodiment thereof, other modifications will be apparent to those skilled in the art without departing from the spirit and scope of the invention as defined by the appended claims.

What is claimed is:

1. An electrostatic synchronous motor comprising rotor shaft means, a plurality of stator element means concentric with said shaft means and insulated therefrom, each of said stator element means being electrically insulated from the other of said stator element means, said stator element means having a plurality of tooth means thereon; rotor means concentric with said shaft means and electrically insulated from said stator element means, said rotor means having a plurality of tooth means thereon; and means in electrically conductive relationship with said stator element means and said rotor means for receiving a supply voltage; said rotor means and said stator element means being in electrostatic cooperative relationship wherein each of said rotor tooth means is in electrostatic cooperative relationship with one tooth means on each of two of said stator means.

2. An electrostatic synchronous motor according to claim 1 wherein a phase of said supply voltage is connected to each of said stator element means.

3. An electrostatic synchronous motor according to claim 1 wherein said stator element means is connected to one terminal of said supply voltage and said rotor means is connected to the other terminal of said supply voltage.

4. An electrostatic synchronous motor according to claim 1 wherein a diode is connected in series with said motor for decreasing the speed of the motor and increasing the power output.

5. An electrostatic synchronous motor according to claim 1 wherein a constant voltage biasing means is coupled to said motor for decreasing the speed and increasing the power output of said motor.

References Cited

UNITED STATES PATENTS

| | | | |
|---|---|---|---|
| 459,678 | 9/1891 | Davis et al. | 310—5 |
| 735,621 | 8/1903 | Thomson | 310—5 X |
| 913,541 | 2/1909 | Myschkin | 310—5 |
| 993,561 | 5/1911 | Smith | 318—116 |
| 1,974,483 | 9/1934 | Brown | 310—5 |
| 2,232,143 | 2/1941 | Schweitzer | 310—5 |
| 3,233,157 | 2/1966 | Stockman | 318—116 |
| 3,297,888 | 1/1967 | Zwolski | 310—6 |

MILTON O. HIRSHFIELD, *Primary Examiner.*

D. E. DUGGAN, *Assistant Examiner.*

U.S. Cl. X.R.

310—5